March 8, 1966 A. SABATINO ETAL 3,238,579
METHOD OF MAKING BATTERY ELEMENTS
Filed April 22, 1963
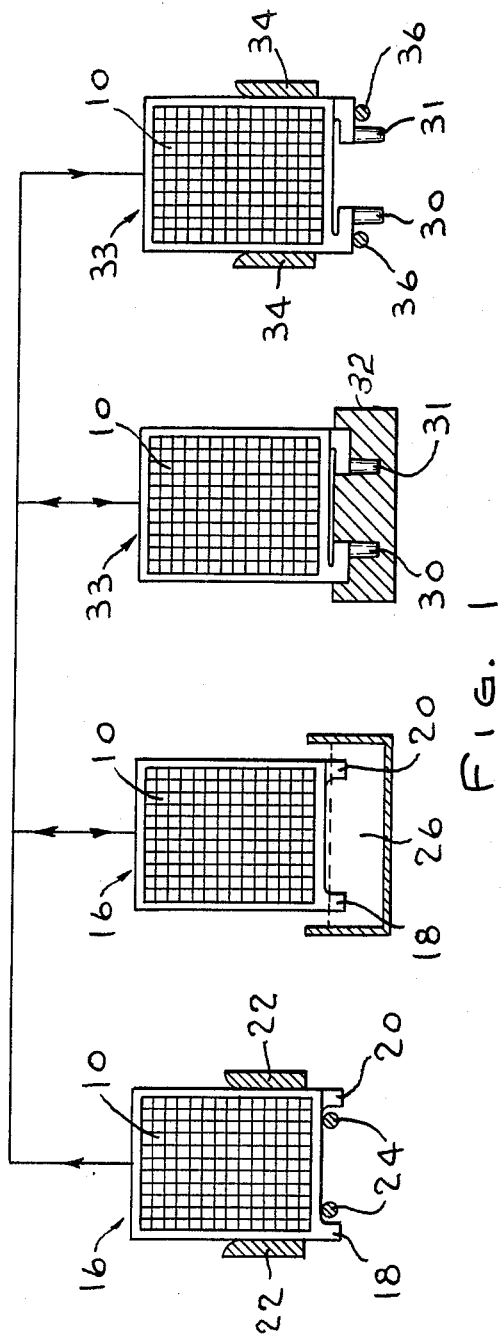
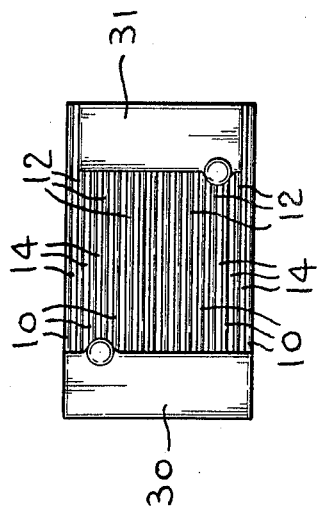
INVENTORS
ANTHONY SABATINO
PAUL V. LOWE
BY
John W. Michael
ATTORNEY United States Patent Office 3,238,579
Patented Mar. 8, 1966

3,238,579
METHOD OF MAKING BATTERY ELEMENTS
Anthony Sabatino and Paul V. Lowe, Milwaukee, Wis., assignors to Globe-Union Inc., Milwaukee, Wis., a corporation of Delaware
Filed Apr. 22, 1963, Ser. No. 274,442
The portion of the term of the patent subsequent to Apr. 22, 1980, has been disclaimed
3 Claims. (Cl. 22—203)

This invention relates to improvements in the method of making an element of a storage battery. More particularly it relates to a new and improved method which may be employed as an alternative to that disclosed in Serial No. 813,865, filed May 18, 1959 (now Patent No. 3,087,005), and Serial No. 274,441, filed April 22, 1963, both assigned to the assignee of this application.

The primary object of this invention is to provide an improved and commercially feasible cast-on method of making a storage battery element whereby proper fusion is regularly produced without extensive prior cleaning of the plates and/or the close maintenance of critical lead mold and plate temperatures.

A further object is to provide a method having the above advantages but without requiring a preheating step.

Another object is to provide an improved method, the steps of which are particularly well adapted for performance by automatic machinery.

These objects are attained by first stacking a plurality of positive and negative plates in alternate relationship with suitable separators between the plates. The plates and separators of the stack are then accurately aligned with the lugs on each group of plates positioned one behind the other.

The next step is the application of a suitable flux to the lugs. Flux is applied by lowering the stack into a flux bath which is comprised of a suitable flux in solution in a relatively low boiling point solvent. By using a low boiling point solvent it is possible to apply a suitable flux to the lugs and to subsequently accomplish sufficient evaporation of the flux solvent from the lugs without the application of heat to the fluxed lugs. This is accomplished by the use of a relatively short dwell period between the fluxing step and the "cast-on" welding step that follows.

The next step comprises the combined casting and welding operation wherein the positive and negative plate lugs are lowered into the molten lead in the respective positive and negative mold cavities. The action of the hot lead on the fluxed lugs further activates the flux reducing any oxides left on the lugs. The active surface of the lug then fuses with the molten lead and any dirt still present floats to the surface. Sound, thoroughly fused welds are thus produced with a high degree of regularity.

Other objects and advantages will be pointed out in or be apparent from the description and claims, as will obvious modifications of the single embodiment shown in the drawings, in which:

FIG. 1 is a partially schematic flow diagram showing the various steps of the method embodying this invention; and FIG. 2 is a plan view of a finished storage battery element.

In the practice of our invention negative and positive plates 10 and 12, respectively, of conventional design are alternately arranged between suitable separators 14 to form a stack 16 with lugs 18 and 20 of the negative and positive plates, respectively, aligned with each other.

The first step after the plates and separators are properly stacked is to accurately align the stack. This can be done in any suitable manner such as that shown in the first step of the flow diagram (FIG. 1) wherein stack 16 is lowered between guides 22 (with lugs 18 and 20 extending downwardly) onto rods 24 which are then vibrated to insure proper alignment.

The next step is the application of a suitable flux to the lugs. Flux is applied by lowering stack 16 into a flux bath 26 to the extent necessary to wet lugs 18 and 20. Flux bath 26 is comprised of a suitable flux in solution in a relatively low boiling point solvent. By using a low boiling point solvent it is possible to apply a suitable flux to the lugs and to subsequently accomplish sufficient evaporation of the flux solvent from the lugs by the use of a relatively short dwell period between the fluxing step and the "cast-on" welding step that follows. This is accomplished without the application of heat to the fluxed lugs as done in the method of our copending applications Serial No. 813,865 and Serial No. 274,441 mentioned above.

The flux dissolved in bath 26 may be of the acid type, rosin or resin type or organic type. One such flux material which provides sound welds is hydrazine monohydrobromide in solution in methyl alcohol which has a boiling point of 149° F.

Generally speaking, solvents having boiling points within the range of approximately 100° F. to 160° F. are preferred, however it would be possible to perform the method of this invention under marginal conditions by using solvents having boiling points within the range of about 40° F. to 220° F.

Specific examples of solvents which fall within the preferred range (100°–160° F.) are methyl alcohol, hexane and acetone. As stated above, methyl alcohol would be suitable for use with a hydrozine salt type of flux. Both hexane and acetone would be suitable for use with organic type solvents such as rosin. Specific examples of solvents which fall within the practical range (40° F.–200° F.) are pentane, ethyl alcohol and trichlorethylene.

After the flux has been applied as described above, a dwell time is provided to allow the flux solvent to evaporate. Such dwell time will vary with the particular flux solvent used. For flux solvents falling within the preferred boiling point range of about -00° F.–160° F. the preferred dwell time will be within the range of about 5 seconds to 5 minutes.

The next step comprises the combined casting and welding operation wherein a negative post strap 30 and a positive post strap 31 are cast in a mold 32 and welded to lugs 18 and 20, respectively, of the plates. The preferred sequence for this combined operation is to first pour the lead alloy into the mold and immediately thereafter to make the welds by inserting lugs 18 and 20 of the plates into the molten lead. The flux on lugs 18 and 20 further reacts with the oxides on the lugs reducing them to free lead and the active surface of the lugs then fuses with the molten lead and any dirt still present floats to the surface. Well fused welds are thus regularly made between lugs and post straps.

While it is preferred that the pour be completed before the plates are lowered, fusion can be made by an alternative method wherein the lugs are first positioned in the mold cavities and then the molten lead is poured into the cavities around the lugs. We have found that the use of a molten lead temperature of 700°–1000° F., while maintaining a mold temperature of 150°–500° F., provides satisfactory results with either method.

The final step is in the unloading of the completed element 33 from the apparatus used to perform the foregoing steps. Here again a pair of guides 34 and rods 36 can be used to support the finished element prior to unloading.

By following the steps outlined above it is possible to manufacture storage battery elements with virtually no rejects due to imperfect welds between plates and straps. This, it is noted, is accomplished without extensive pre-cleaning of the lugs and without the maintenance of critical temperature conditions. Thus, for the first time, by the use of a suitable flux as outlined above, the "cast-on" method of casting and welding post straps to the plates of a stack has been successfully put into commercial practice.

It should be noted that in the performance of each of the steps described above and illustrated in FIG. 1, the stack 16 remains in the same relative position, i.e. with lugs 18 and 20 down. Thus, it is seen that the method of this invention is particularly well adapted for performance by automatic machinery where, for example, the aligned stack could be clamped to an overhead arm and moved to successive stations for the application of flux, preheating, welding, and unloading.

Although but one embodiment of the present invention has been illustrated and described, it will be apparent to those skilled in the art that various changes and modifications may be made therein without departing from the spirit of the invention or from the scope of the appended claims.

We claim:
1. In the cast-on method of welding a battery plate to a battery post strap which combines the steps of casting the strap and the welding of it to the plate by bringing the plate and strap into contact with each other while the strap is in a molten state in a mold consisting of the steps of:
   applying a flux to that portion of the battery plate which is to be contacted by the molten lead alloy strap prior to such contact, such flux being applied while in solution in a solvent having a boiling point within the range of approximately 100° F. to 160° F.; and
   allowing the solvent on said that portion of the battery plate to evaporate before the strap and plate are welded together, said time for evaporation being within the range of approximately 5 seconds to 5 minutes.
2. In the cast-on method of welding a battery plate to a battery post strap which combines the steps of casting the strap and the welding of it to the plate by bringing the plate and strap into contact with each other while the strap is in a molten state in a mold consisting of the steps of:
   applying a flux to that portion of the battery plate which is to be contacted by the molten lead alloy strap prior to such contact, such flux being applied while in solution in a solvent having a boiling point within the range of approximately 40° F. to 220° F.; and
   allowing the solvent on said that portion of the battery plate to evaporate prior to the welding of the strap to the plate.
3. The cast-on method according to claim 2 in which said flux is applied by inserting said that portion of said battery plate into a bath comprised of said flux solution.

References Cited by the Examiner

UNITED STATES PATENTS

| | | | |
|---|---|---|---|
| 971,136 | 9/1910 | Monnet | 22—204 |
| 1,797,684 | 3/1931 | Handler | 22—203 |
| 1,811,292 | 6/1931 | Barhoff | 22—204 |
| 2,403,109 | 7/1946 | Miller | 29—495 |
| 2,454,053 | 11/1948 | Galloway | 22—204 |
| 2,774,137 | 12/1956 | Yarow | 29—495 |
| 2,880,126 | 3/1959 | Jordan | 148—23 |
| 2,908,599 | 10/1959 | Medsker | 148—23 |
| 2,980,562 | 4/1961 | Matter et al. | 148—23 |
| 3,087,005 | 4/1963 | Sabatino et al. | 136—176 |
| 3,140,538 | 7/1964 | Rutledge | 29—495 |

J. SPENCER OVERHOLSER, *Primary Examiner.*

MARCUS U. LYONS, MICHAEL V. BRINDISI,
*Examiners.*